United States Patent

Newsam

[11] Patent Number: 4,504,346
[45] Date of Patent: Mar. 12, 1985

[54] METHOD OF MANUFACTURING A DAMPED RESONATOR ACOUSTICAL PANEL

[75] Inventor: Susan M. Newsam, Derby, England

[73] Assignee: Rolls-Royce Limited, London, England

[21] Appl. No.: 541,315

[22] Filed: Oct. 12, 1983

[30] Foreign Application Priority Data

Nov. 30, 1982 [GB] United Kingdom ............... 8234126

[51] Int. Cl.³ ..................... B32B 31/12; G10K 11/16
[52] U.S. Cl. ................... 156/242; 156/290; 156/291; 156/320; 181/284; 181/292; 181/296
[58] Field of Search ............... 156/87, 242, 285, 290, 156/307.3, 307.7, 320; 181/284, 290, 292, 296

[56] References Cited

U.S. PATENT DOCUMENTS 3,166,149  1/1965  Hulse et al. ..................... 181/292
3,502,171  3/1970  Cowan ........................... 181/292
4,111,081  9/1978  Hilliard et al. .................. 181/290

Primary Examiner—Caleb Weston
Attorney, Agent, or Firm—Cushman, Darby & Cushman

[57] ABSTRACT

A method of manufacturing a damped resonator acoustical panel in which a porous acoustical damping fabric and a resin impregnated open weave fabric are laid up and subjected to moulding by the application of heat and pressure thereto to cause a portion of the resin from the open weave fabric to impregnate the abutting portions of the acoustical damping fabric and bond the fabrics together. A film of an adhesive is then applied to the open weave fabric and heated by a hot gas stream until it reticulates. The bonded fabrics are then bonded to the edges of an open honeycomb core by means of the reticulated adhesive. A solid sheet is bonded to the other side of the honeycomb core in order to close the cells thereof.

5 Claims, 4 Drawing Figures

METHOD OF MANUFACTURING A DAMPED RESONATOR ACOUSTICAL PANEL

This invention relates to a method of manufacturing a damped resonator acoustical panel.

It is known to provide a damped resonator acoustical panel which comprises a cellular core layer interleaved between a solid sound reflecting sheet and a porous sound absorbing sheet. The porous layer is usually made up of a first layer which helps to provide structural rigidity to the cellular core layer but is substantially acoustically transparent. The second layer is less porous than the first layer and serves to produce a power loss in sound waves which are directed at the panel. The cellular core layer, which is usually in the form of an open cell honeycomb material, serves to partition the air layer between the solid and porous sheets.

The usual method of manufacturing such an acoustical panel is to adhesively bond together its various constituent layers. This can be difficult to achieve however because of the problems associated with achieving an effective bond between the two constituent layers of the porous layer and also between the porous layer and the cellular core layer.

It is an object of the present invention to provide a method of manufacturing a damped resonator acoustical panel in which there is improved bonding between the various constituent layers of the panel.

According to the present invention, a method of manufacturing a damped resonator acoustical panel comprises the steps of laying up a sheet of an open weave fabric, the filaments of which are resin impregnated, and a sheet of a porous acoustical damping fabric, moulding said laid up sheets by the application of heat and pressure thereto so as to cause a portion of the resin from the filaments of said open weave fabric to impregnate said acoustical damping fabric and bond said sheets together, said resin being of such a viscosity at the moulding temperature that only those portions of said acoustical damping fabric which abut the filaments of said open weave fabric are impregnated with said resin so that non-abutting portions of said acoustical damping fabric remain unimpregnated, applying a film of an adhesive to said open weave fabric, heating said film by a hot gas stream until it reticulates, applying said bonded sheets to one side of a cellular core having open cells so that said reticulated film abuts the edges of said open cells and bonds said bonded sheets to said cellular core, and bonding a solid, sound reflective sheet to the edges of the open cells on the other side of said cellular core in order to fully close the cells thereof.

The invention will now be described, by way of example, with reference to the accompanying drawings in which.

Figure 1:
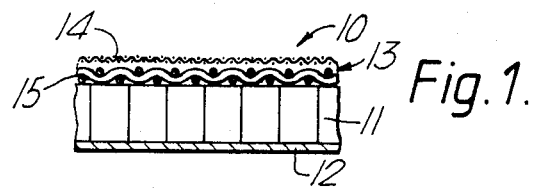
FIG. 1 is a sectional side view of a portion of a damped resonator acoustical panel manufactured in accordance with the method of the present invention.

With reference to FIG. 1, a damped resonator acoustical panel generally indicated at 10 comprises an aluminium cellular core 11 which is in the form of a plurality of open honeycomb cells. It will be appreciated, however, that the cellular core 11 need not necessarily be in the form of honeycomb cells but that other open cells could be utilised if they are acoustically acceptable. Moreover the cellular core 11 may be made from a material other than aluminium if desired. The open cells of the cellular core 11 are enclosed by a solid sound reflecting aluminium sheet 12 on one side and by a porous sheet 13 on the other side.

Figure 2:
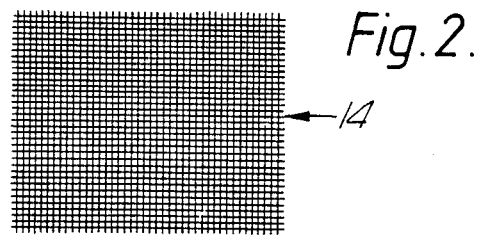
FIG. 2 is a plan view of a portion of the porous acoustical damping fabric of the damped resonator acoustical panel shown in FIG. 1.

The porous sheet 13 is made up of two porous fabrics 14 and 15 which are bonded together. The first fabric 14, which can be seen more clearly in FIG. 2, is made up of closely woven polyester filaments so that the fabric 14 functions as an acoustic damper. One particularly suitable fabric has an air flow of 1100 L/m$^2$/sec. at 20 mm water pressure, a weight of 180 gsm, a thickness of 278 microns and a nominal filter rating of 41 microns. It will be appreciated however that other suitable fabrics may be utilised and that these need not necessarily be woven from polyester filaments. Thus, for instance stainless steel filaments could be used. The important criterion in selecting the fabric 14 is its ability to function as an acoustical damper.

Figure 3:
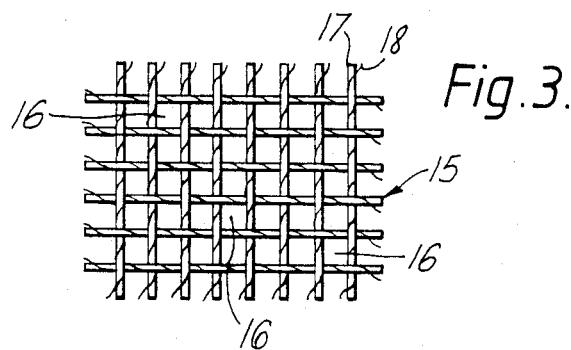
FIG. 3 is a plan view of portion of the open weave fabric of the damped resonator acoustical panel shown in FIG. 1.

The second fabric 15, which can be seen more clearly in FIG. 3, is an open weave fabric which defines a plurality of apertures 16. The second fabric 15 is woven from filaments 17 which are constituted by carbon fibre tows bound by Dacron polyester filaments 18. The binding filaments 18 are necessary to restrict the degree to which the carbon fibre tows spread under pressure. The sizes of the apertures 16 are selected such that the second fabric 15 provides little acoustic impedance. We have found that an aperture 16 area of approximately 30% of the total area of the second sheet 15 is satisfactory in providing the necessary low level of acoustic impedance.

Figure 4:
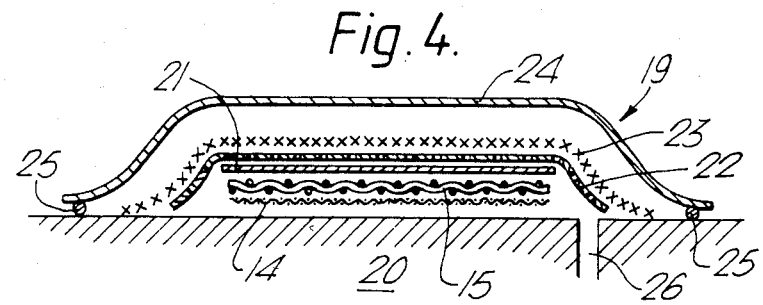
FIG. 4 is a sectional side view of apparatus for use in the bonding together of the fabrics shown in FIGS. 2 and 3.

The filaments 17 of the second sheet 15 are impregnated with an epoxy resin which functions as a matrix material and facilitates the bonding together of the first and second fabrics 14 and 15. The bonding is achieved by laying up the first and second fabrics 14 and 15 in the moulding apparatus 19 shown in FIG. 4. In that apparatus, the first and second fabrics 14 and 15 are laid up on a base plate 20 with the first fabric 14 adjacent the base plate 20. A release material 21 is placed over the laid up fabrics 14 and 15 and a microporous film 22 such as Celguard microporous film 4510 (manufactured by Celanese Plastic Company USA), and a flexible breather fabric 23 are placed over the release material 21. The various laid up layers are then enclosed by a flexible vacuum bag 24 which is attached to the base plate 20 by means of a seal 25.

The volume enclosed by the vacuum bag 24 is evacuated by the withdrawal of air through a vent 26 provided in the base plate 20. The temperature of the assembly is then increased and external pressure applied to the evacuated vacuum bag 24. The elevated temperature and applied pressure are maintained to achieve moulding, that is the flow of resin from the second fabric 15 to the first fabric 14 and the partial curing of the resin to bond the fabrics 14 and 15 together. After dwelling at the moulding temperature and pressure, the assembly is cooled and the pressure released. The bonded fabrics 14 and 15 are finally heated at elevated temperature in order to post-cure the resin.

A typical cycle would be:
(a) Apply the vacuum.
(b) After 30 minutes increase the temperature of the assembly to 115° C. at a rate of 1.6° C. per minute.
(c) Apply a pressure of 50 to 100 p.s.i. to the evacuated vacuum bag 24 and vent the vacuum.
(d) Increase the temperature of the assembly to 125° C. at a rate of 1.6° C. per minute.
(e) Dwell for one hour at 125° C. to achieve moulding.
(f) Cool the assembly to below 60° C., release the applied pressure and dismantle the assembly.
(g) Post-cure the bonded fabrics 14 and 15 for 2 hours at 150° C.–175° C.

The second fabric 15 and the resin with which it is impregnated are selected such that the final moulded thickness of the second fabric 15 is between 0.025 and 0.030 inches. Moreover the resin is also selected so that its minimum viscosity at the moulding temperature is such that only those portions of the first fabric 14 which actually abut the second fabric 15 are impregnated by the resin. This ensures that those portions of the first fabric 14 which do not abut the second fabric 15 i.e. those adjacent the apertures 16, are not impregnated with resin and are therefore sound permeable. We have found that an epoxy resin with a viscosity of 60–200 poises at the moulding temperature is suitable for this purpose.

After the bonded fabrics 14 and 15 have been removed from the apparatus 19 and post-cured, a film of an adhesive is applied to the face of the second fabric 15 which is not bonded to the first fabric 14. A suitable adhesive is Redux 319 (Redux is a registered trademark) which is a modified epoxy film adhesive manufactured by Ciba-Geigy. The film is then heated by blowing hot air on to it through the first fabric 14 until the film reticulates i.e. forms itself into a network of adhesive which only covers the filaments 17 of the second fabric 15, thereby leaving the apertures 16, and hence those portions of the first fabric 14 which are adjacent the apertures 16, free of adhesive. The porous sheet 13 constituted by the bonded fabrics 14 and 15 is then bonded to the edges of the open cells of the cellular core 11 by means of the reticulated film of adhesive.

The solid sound reflecting aluminium sheet 12 is bonded to the edges of the open cells on the other side of the cellular core 11 by a suitable adhesive. This step may be carried out either before or after the bonding of the porous sheet to the cellular core 11.

It will be seen therefore that the resultant damped resonator acoustical panel 10 has a porous acoustical damping fabric 14 supported by an open weave fabric 15 covering the open cells of the cellular core 11. Thus sound impinging upon the panel 10 is damped by the first fabric 14 before finally being absorbed in the air layer which is defined by the porous sheet 13 and the solid sheet 12 and is subdivided by the honeycomb cells of the cellular core 11.

I claim:
1. A method of manufacturing a damped resonator acoustical panel including porous acoustical damping parts in which constituent parts are assembled with an adhesive bond between them while the porous acoustical damping parts remain devoid of substantial adhesive contamination, said process comprising the steps of:
(1) laying up a sheet of an open weave fabric which fabric is constituted by a plurality of resin impregnated filaments, and a sheet of a porous acoustical damping fabric,
(2) moulding said sheets by the application of heat and pressure thereto so as to cause a portion of the resin from the filaments of said open weave fabric to flow into and impregnate said acoustical damping fabric and bond said sheets together, the viscosity of said resin being selected such that at the moulding temperature, only those portions of said acoustical damping fabric which abut the filaments of said open weave fabric are impregnated with said resin so that non-abutting portions of said acoustical damping fabric remain unimpregnated and are sound permeable,
(3) applying a film of an adhesive to said open weave fabric,
(4) heating said film by a hot gas stream until it reticulates and forms itself into a network of adhesive which covers only the filaments of the open weave fabric leaving the open areas of said open weave fabric and those portions of said acoustical damping fabric free of adhesive,
(5) applying said bonded sheets to one side of a cellular core having open cells so that said reticulated adhesive film abuts the edges of said open cells and bonds said bonded sheets to said cellular core, and
(6) bonding a solid, sound reflecting sheet to the edges of said open cells on the opposite side of said cellular core in order to fully close the cells thereof.

2. A method of manufacturing a damped resonator acoustical panel as in claim 1 wherein said porous acoustical damping fabric is constituted by closely woven polyester filaments.

3. A method of manufacturing a damped resonator acoustical panel as in claim 1 wherein said open weave fabric is constituted by open woven tows of carbon fibre which are bound by polyester filaments.

4. A method of manufacturing a damped resonator acoustical panel as in claim 1 wherein the viscosity of the resin with which the filaments of said open weave fabric are impregnated is within the range 60–200 poises at said moulding temperature.

5. A method of manufacturing a damped resonator acoustical panel as in claim 1 wherein said open weave fabric has an aperture area which is approximately 30% of the total area of the fabric.

* * * * *